US011230208B2

(12) United States Patent
Flick et al.

(10) Patent No.: US 11,230,208 B2
(45) Date of Patent: Jan. 25, 2022

(54) RAIL AND VEHICLE SEAT

(71) Applicant: Adient Luxembourg Holding S.á.r.l., Luxembourg (LU)

(72) Inventors: Joachim Flick, Hueckeswagen (DE); Erik Sprenger, Wermelskirchen (DE); Ingo Quast, Duesseldorf (DE); Turgay Turan, Kerpen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 0 days.

(21) Appl. No.: 16/334,162

(22) PCT Filed: Sep. 20, 2017

(86) PCT No.: PCT/EP2017/073786
§ 371 (c)(1),
(2) Date: Mar. 18, 2019

(87) PCT Pub. No.: WO2018/054979
PCT Pub. Date: Mar. 29, 2018

(65) Prior Publication Data
US 2019/0389332 A1 Dec. 26, 2019

(30) Foreign Application Priority Data

Sep. 21, 2016 (DE) .................... 10 2016 218 133.5
Dec. 21, 2016 (DE) .................... 10 2016 225 818.4

(51) Int. Cl.
*B60N 2/07* (2006.01)
*B60N 2/08* (2006.01)

(52) U.S. Cl.
CPC ............ *B60N 2/0727* (2013.01); *B60N 2/07* (2013.01); *B60N 2/0715* (2013.01); *B60N 2/08* (2013.01); *B60N 2/0705* (2013.01)

(58) Field of Classification Search
CPC .. B60N 2/0727; B60N 2/0705; B60N 2/0715; B60N 2/0818; B60N 2/0722;
(Continued)

(56) References Cited

U.S. PATENT DOCUMENTS 3,539,138 A * 11/1970 Desroches ................ F16L 3/14
248/62
3,631,740 A * 1/1972 Gavagan .............. B60N 2/0843
74/527

(Continued)

FOREIGN PATENT DOCUMENTS

CN      203623414 U    6/2014
DE  102010049542 A1    4/2012
(Continued)

OTHER PUBLICATIONS

China National Intellectual Property Administration. Office Action in Application No. 201780057806.6, dated Nov. 30, 2020, 13 pages.

*Primary Examiner* — Jonathan Liu
*Assistant Examiner* — Taylor L Morris
(74) *Attorney, Agent, or Firm* — Marshall & Melhorn, LLC

(57) ABSTRACT

A vehicle seat longitudinal adjuster (106) includes a seat track pair (1) with a lower seat track (2) and an upper seat track (4) that mutually engage one another for guided relative and longitudinal direction (x) movement. The lower seat track (2) has a substantially C-shaped profile (20, 22) with sections (24) that are bent downward at the ends. The upper seat track (4) has a substantially U-shaped profile (40, 42) with end sections (44) that are bent upward; the relative displaceability of the two seat tracks (2, 4) with respect to one another is limited by means of an interaction of an end stop (30) disposed on the lower seat track (2) with a stop element (48) disposed on the upper seat track (4), and wherein the end stop (30) is designed in the form of an (Continued)

extension of part of the downward bent sections (24) and the lower seat track (2) comprises a slotted hole (32) in the region of the end stop (30).

16 Claims, 6 Drawing Sheets

(58) Field of Classification Search
CPC ....... B60N 2205/20; B60N 2/42709; B60N 2/073; B60N 2/427; B60R 2022/283; B60R 2022/286
See application file for complete search history.

(56) References Cited

U.S. PATENT DOCUMENTS

| | | | | |
|---|---|---|---|---|
| 3,724,603 A * | 4/1973 | Shiomi | ............... | F16F 7/123 188/371 |
| 4,204,658 A * | 5/1980 | Courtois | ............. | B60N 2/0705 248/430 |
| 4,569,563 A * | 2/1986 | Fourrey | ............... | B60N 2/072 384/49 |
| 4,787,667 A * | 11/1988 | Nishino | ............... | B60N 2/0705 248/430 |
| 5,222,814 A * | 6/1993 | Boelryk | ............... | B60N 2/072 248/430 |
| 5,718,477 A * | 2/1998 | Schuler | ............... | B60N 2/0705 297/341 |
| 5,741,000 A * | 4/1998 | Goodbred | ........... | B60N 2/0705 248/424 |
| 5,848,698 A * | 12/1998 | Stompe | ............... | A47F 5/0068 206/449 |
| 6,286,799 B1 * | 9/2001 | Fujii | .................... | B60N 2/071 248/430 |
| 6,352,312 B1 * | 3/2002 | Rees | .................... | B60N 2/071 248/429 |
| 6,767,029 B2 * | 7/2004 | Jaudouin | ............... | B60N 2/067 248/429 |
| 6,874,746 B2 * | 4/2005 | Ganot | .................. | B60N 2/0705 248/429 |
| 7,147,195 B2 * | 12/2006 | Danjo | ................. | B60N 2/072 248/430 |
| 7,503,614 B2 * | 3/2009 | Yamada | ............... | B60N 2/0727 296/65.13 |
| 7,815,159 B2 * | 10/2010 | Moriyama | ........... | B60N 2/0725 248/430 |
| 7,887,086 B2 * | 2/2011 | Kalandek | ............. | B60R 21/213 280/728.2 |
| 7,992,834 B2 * | 8/2011 | Kojima | ............... | B60N 2/0725 248/429 |
| 7,993,060 B2 * | 8/2011 | Kojima | ............... | B60N 2/0727 384/47 |
| 8,033,520 B2 * | 10/2011 | Fujieda | ............... | B60N 2/0727 248/430 |
| 8,251,335 B2 * | 8/2012 | Kojima | ............... | B60N 2/0727 248/429 |
| 8,251,336 B2 * | 8/2012 | Kimura | ................. | F16C 33/38 248/430 |
| 8,282,151 B2 * | 10/2012 | Kojima | ............... | B60N 2/0727 296/65.13 |
| 8,678,336 B2 * | 3/2014 | Couasnon | ........... | B60N 2/0705 248/429 |
| 8,708,300 B2 * | 4/2014 | Fujishiro | ............. | B60N 2/0705 248/424 |
| 8,813,457 B2 * | 8/2014 | Underkofler | ............. | E04B 9/30 52/712 |
| 9,016,655 B2 * | 4/2015 | Aoi | ....................... | B60N 2/0875 248/430 |
| 9,102,245 B2 * | 8/2015 | Mischer | ............... | B60N 2/0727 |
| 9,108,532 B2 * | 8/2015 | Seille | ................... | B60N 2/0868 |
| 9,783,082 B2 * | 10/2017 | Sato | ...................... | B60N 2/0806 |
| 9,802,511 B2 * | 10/2017 | Matsushima | ......... | B60N 2/0818 |
| 9,902,294 B2 * | 2/2018 | Mischer | ............... | B60N 2/0705 |
| 2004/0108762 A1 * | 6/2004 | Borbe | .................. | B60N 2/0705 297/344.11 |
| 2005/0012013 A1 * | 1/2005 | Dill | ....................... | B60N 2/0705 248/424 |
| 2005/0067546 A1 * | 3/2005 | Dinh | ..................... | H02G 3/125 248/343 |
| 2009/0236488 A1 * | 9/2009 | Koga | ..................... | B60N 2/067 248/429 |
| 2010/0098357 A1 * | 4/2010 | Beneker | ............... | B60N 2/0715 384/34 |
| 2010/0207419 A1 * | 8/2010 | Kojima | ................ | B60N 2/0727 296/65.13 |
| 2011/0024595 A1 * | 2/2011 | Oi | ......................... | B60N 2/0843 248/429 |
| 2011/0240821 A1 * | 10/2011 | Couasnon | ............ | B60N 2/0727 248/429 |
| 2012/0132778 A1 * | 5/2012 | Nakamura | ........... | B60N 2/0705 248/429 |
| 2012/0205512 A1 * | 8/2012 | Fujishiro | ................ | B60N 2/433 248/429 |
| 2013/0049416 A1 * | 2/2013 | Funke | ................. | B60N 2/42709 297/216.13 |
| 2013/0200243 A1 * | 8/2013 | Mischer | ................ | B60N 2/0705 248/429 |
| 2013/0206952 A1 * | 8/2013 | Yamada | ............... | B60N 2/0722 248/429 |
| 2014/0103626 A1 * | 4/2014 | Seki | ................... | B60N 2/42745 280/730.2 |
| 2014/0110553 A1 * | 4/2014 | Hoshihara | ............... | B60N 2/06 248/429 |
| 2014/0110554 A1 * | 4/2014 | Oya | ..................... | B60N 2/0705 248/430 |
| 2014/0138510 A1 * | 5/2014 | Yamada | ............... | B60N 2/0705 248/429 |
| 2014/0353454 A1 * | 12/2014 | Yamada | ............... | B60N 2/0705 248/430 |
| 2015/0090855 A1 * | 4/2015 | Arakawa | .................. | B60N 2/07 248/429 |
| 2015/0307011 A1 * | 10/2015 | Ushiyama | ............ | B60N 2/0715 297/344.1 |
| 2015/0367754 A1 * | 12/2015 | Walter | ................. | B60N 2/0705 297/344.1 |
| 2016/0288740 A1 * | 10/2016 | Katou | ...................... | B60N 2/90 |
| 2017/0334316 A1 * | 11/2017 | Laumeier | ............... | F16C 29/048 |
| 2018/0215289 A1 * | 8/2018 | Sato | ..................... | B60N 2/4221 |
| 2018/0222354 A1 * | 8/2018 | Hoshihara | ............. | B60N 2/085 |
| 2020/0001745 A1 * | 1/2020 | Shimizu | ............... | B60N 2/0818 |
| 2020/0238860 A1 * | 7/2020 | Taniguchi | ............ | B60N 2/0727 |

FOREIGN PATENT DOCUMENTS

| | | |
|---|---|---|
| DE | 202008018315 U1 | 11/2012 |
| DE | 102012015343 A1 | 1/2014 |
| DE | 102014219868 A1 | 3/2016 |
| DE | 102016208469 A1 | 12/2016 |
| FR | 2286723 A1 | 4/1976 |
| FR | 2996179 A1 | 4/2014 |
| FR | 2996182 A1 | 4/2014 |
| FR | 2997658 A1 | 5/2014 |
| JP | 200567218 A | 3/2005 |
| JP | 2009179122 A | 8/2009 |

* cited by examiner

RAIL AND VEHICLE SEAT

CROSS REFERENCE TO RELATED APPLICATIONS

This application is a United States National Phase Application of International Application PCT/EP2017/073786, filed Sep. 20, 2017, and claims the benefit of priority under 35 U.S.C. § 119 of German Applications 10 2016 218 133.5, filed Sep. 21, 2016 and 10 2016 225 818.4, filed Dec. 21, 2016, the entire contents of which are incorporated herein by reference.

TECHNICAL FIELD

The invention relates to a longitudinal adjuster, in particular for a vehicle seat, having at least one seat rail pair which is formed by a lower seat rail and an upper seat rail which is displaceably guided relative to the lower seat rail in the longitudinal direction, wherein the two seat rails of the seat rail pair mutually engage around each other, wherein the lower seat rail has a substantially C-shaped profile with portions which are bent downward at the ends and the upper seat rail has a substantially U-shaped profile having end portions which are bent upward, wherein the relative displaceability of the two seat rails with respect to each other is limited by means of a cooperation of an end stop which is arranged on the lower seat rail with a stop element which is arranged on the upper seat rail, and a vehicle seat.

TECHNICAL BACKGROUND

JP 2005-67218A discloses a generic vehicle seat with a longitudinal displacement mechanism having end stops for limiting the displacement path. The longitudinal displacement mechanism has end stops between an upper rail and a lower rail, wherein limitation elements of the lower rail and limitation elements of the upper rail are arranged on the same part-regions which project in the longitudinal direction.

DE 20 2008 018 315 U1 discloses a seat sliding device for a vehicle, having at least a first rail which is adapted to be secured to one of a vehicle floor and a vehicle seat, wherein the first rail has a wall portion having a pair of insertion openings which are arranged in a width direction of the first rail; at least a second rail which is adapted to be secured to the other of the vehicle floor and the vehicle seat, wherein the second rail is mounted on the first rail in order to be slidingly movable relative to the first rail and cooperates with the first rail in order to form an inner space; a first stop with a securing portion and a pair of movement limitation portions.

DE 10 2016 208 469 A1 discloses a sliding rail which has a fixed rail, a running rail; and four locking pieces which are fitted to one of the rails. The four locking pieces are configured in such a manner that, in order to block a sliding movement between the rails, they can engage in a force-activated manner in locking grooves which are formed in the other of the rails. Each locking groove has a predetermined groove width in a sliding direction. The locking grooves are arranged at intervals in the sliding direction which are each three times the groove width.

FR 2 286 723 A1 discloses a rail for adjusting vehicle seats. The rail comprises a lower U-profile which is secured to the bodywork and an inverted U-profile which is secured to the seat. A relative displacement of the rails is facilitated by means of a row of balls. The balls travel in a portion of the lower U-profile, whilst faces of a portion of the upper U-profile which abuts them are inclined in order to push the balls outward.

SUMMARY

An object of the invention is to improve a longitudinal adjuster of the type mentioned in the introduction, in particular to enable an optimized arrangement and configuration of end stops in order to limit the relative displaceability with respect to each other, and to provide a corresponding vehicle seat.

This object is achieved according to the invention with a longitudinal adjuster, in particular for a vehicle seat, having at least one seat rail pair which is formed by a lower seat rail and an upper seat rail which is displaceably guided relative to the lower seat rail in the longitudinal direction, wherein the two seat rails of the seat rail pair mutually engage around each other, wherein the lower seat rail has a substantially C-shaped profile with portions which are bent downward at the ends and the upper seat rail has a substantially U-shaped profile having end portions which are bent upward, wherein the relative displaceability of the two seat rails with respect to each other is limited by means of a cooperation of an end stop which is arranged on the lower seat rail with a stop element which is arranged on the upper seat rail, wherein the end stop is configured in the form of a partial extension of the downwardly bent portions of the lower seat rail and the lower seat rail has an elongate hole in the region of the end stop.

A result of the fact that the end stop is configured in the form of a partial extension of the downwardly bent portions of the lower seat rail, an end stop can be provided in the lower seat rail without impairing the material of the lower seat rail, for example, by means of a separate free-cutting operation. In particular, no additional cut-outs or free-cuts which could influence a rigidity or a strength of the lower seat rail are required in the lower seat rail.

As a result of the fact that the lower seat rail has an elongate hole in the region of the end stop, the lower seat rail can be prevented from bending upward and/or outward in the event of overloading of the end stop. In order to counteract undesirable distortion of the lower seat rail, the elongate hole together with a web which is formed below the elongate hole brings about a selective introduction of the bending forces acting on the end stop, whereby excessive acting energy, in particular a tensile load, is absorbed, consequently reduced, and bending upward of the front ends of the lower seat rail is reduced.

The end stop can when viewed in the longitudinal direction be arranged in the region of a front and/or rear end of the lower seat rail. Furthermore, two end stops may be provided, in particular one each in the region of a front end of the lower seat rail and one in the region of a rear end of the lower seat rail.

The end stop may, when viewed in the longitudinal direction, be arranged in front of and/or behind a tooth arrangement of the lower seat rail. The end stop may have two adjacent stop faces which are arranged at an obtuse angle relative to each other. It is thereby possible using simple means to ensure a centering so that in the event of a crash a covering of the stop elements and the end stop can be maintained and in particular a sliding of the stop element in a vertical direction can be prevented.

The stop element may be deployed in a transition region between the U-shaped profile of the upper seat rail and the respective end portions. The stop element can thereby be produced in a profile region of the upper seat rail which impairs no other function or interface of the seat rail. Furthermore, the stop elements may be arranged in a region into which it is impossible to see after assembly, whereby an aesthetic appearance of the longitudinal adjuster is maintained. Furthermore, as a result of a corresponding arrangement of the end stop and the stop element, a formation of freely accessible edges can be prevented, whereby the potential for injury is reduced. Furthermore, the advantage can be achieved that the hollow space formed between the lower seat rail and the upper seat rail is not limited by the stop element if the upper seat rail is displaced relative to the lower seat rail, whereby adequate structural space is maintained in the hollow space, for example, for screwing to the vehicle seat or a vehicle structure and the assembly of additional components and subassemblies.

The stop element may be deployed substantially parallel with a transverse direction. The upper seat rail may have a free-cut in the region of the stop element. The stop element may have an opening.

Furthermore, two end stops may be provided, in particular one in the region of a front end of the lower seat rail and one in the region of a rear end of the lower seat rail. The stop element may be arranged between the two end stops. The stop element may be arranged in a central third of the upper seat rail in the longitudinal direction. Furthermore, a plurality of stop elements may be arranged between the two end stops, in particular in the central third of the upper seat rail.

The object is further achieved by a vehicle seat having a longitudinal adjuster according to the above description. The vehicle seat according to the invention consequently has the same advantages as the embodiments of the longitudinal adjuster described above.

Before embodiments of the invention are described below in greater detail with reference to drawings, it should first be noted that the invention is not limited to the components described or the method steps described. Furthermore, the terminology used also does not represent any limitation, but instead is merely of an exemplary nature. Whenever the singular is used below in the description and the claims, the plural is also included in each case unless the context explicitly excludes this.

The invention is explained in greater detail below with reference to an advantageous embodiment illustrated in the Figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF PREFERRED EMBODIMENTS

Figure 1:
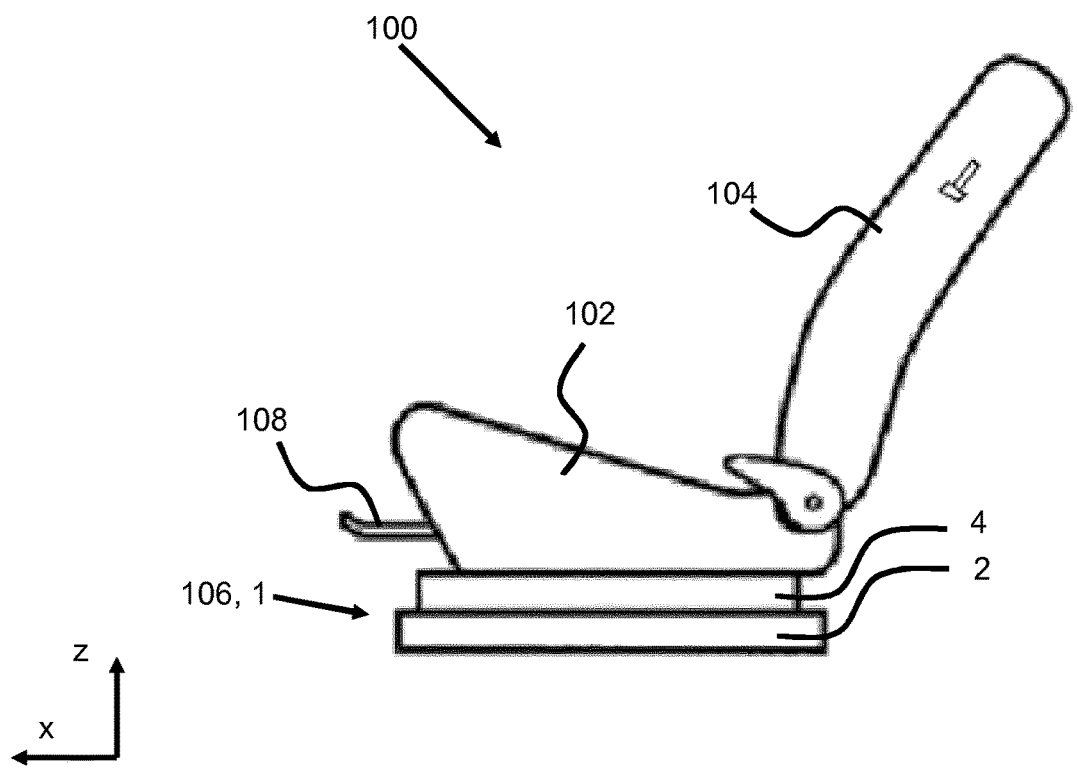
FIG. 1 is a schematic illustration of a vehicle seat having a longitudinal adjuster according to the invention.

Referring to the drawings, a vehicle seat 100 schematically illustrated in FIG. 1 is described below using three spatial directions which extend perpendicularly to each other. A longitudinal direction x extends when a vehicle seat 100 is installed in the vehicle substantially horizontally and preferably parallel with a longitudinal vehicle direction which corresponds to the usual travel direction of the vehicle. A transverse direction y which extends perpendicularly to the longitudinal direction x is also orientated horizontally in the vehicle and extends parallel with a transverse vehicle direction. A vertical direction z extends perpendicularly to the longitudinal direction x and perpendicularly to the transverse direction y. When a vehicle seat 100 is installed in the vehicle, the vertical direction z extends parallel with the vertical vehicle axis.

The position and direction indications used, such as, for example, front, rear, top and bottom, refer to a viewing direction of a passenger sitting in a seat portion 102 of the vehicle seat 100 in a normal sitting position, wherein the vehicle seat 100 is installed in the vehicle, is in a position for use which is suitable for transporting persons with an upright backrest 104 and is orientated in the usual manner in the travel direction. However, the vehicle seat 100 according to the invention may also be installed with a different orientation, for example, transversely relative to the travel direction.

The vehicle seat 100 shown in FIG. 1 for a motor vehicle has the seat portion 102 and a backrest 104 which can be adjusted in terms of its inclination relative to the seat portion 102. An inclination of the backrest 104 may, for example, be adjustable by means of a locking fitting or a gear fitting. The vehicle seat 100 is assembled to adjust a longitudinal seat position on a longitudinal adjuster 106.

Figure 2:
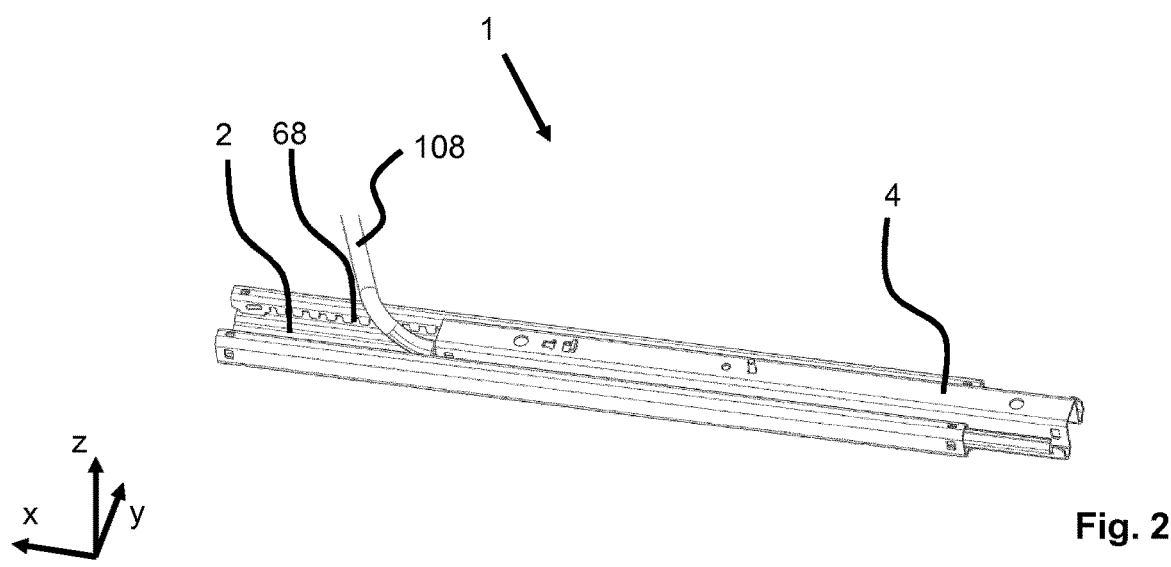
FIG. 2 is a schematic illustration of a seat rail pair of the longitudinal adjuster according to the invention.

FIG. 2 is a schematic illustration of a seat rail pair 1 of the longitudinal adjuster 106. The seat rail pair 1 is formed by an upper seat rail 4, which can also be referred to as an upper rail, and a lower seat rail 2, which can also be referred to as a lower rail. A locking device may be arranged in a hollow space formed between the lower seat rail 2 and the upper seat rail 4. The locking device can be actuated by means of an actuation lever 108. Fundamentally, a structure and a function of devices for actuating the locking device, in particular for moving a locking plate 60 of the locking device into an unlocking position or a locking position, are known. In this regard, reference may be made by way of example to DE 10 2010 049 542 A1 and DE 10 2014 219 868 A1, the content of which is expressly incorporated herein by reference.

The lower seat rail 2 has a tooth arrangement 68 which cooperates with the locking plate 60 guided in the upper seat rail 4 in a manner known per se in order to adjust a longitudinal seat position.

Figure 3:
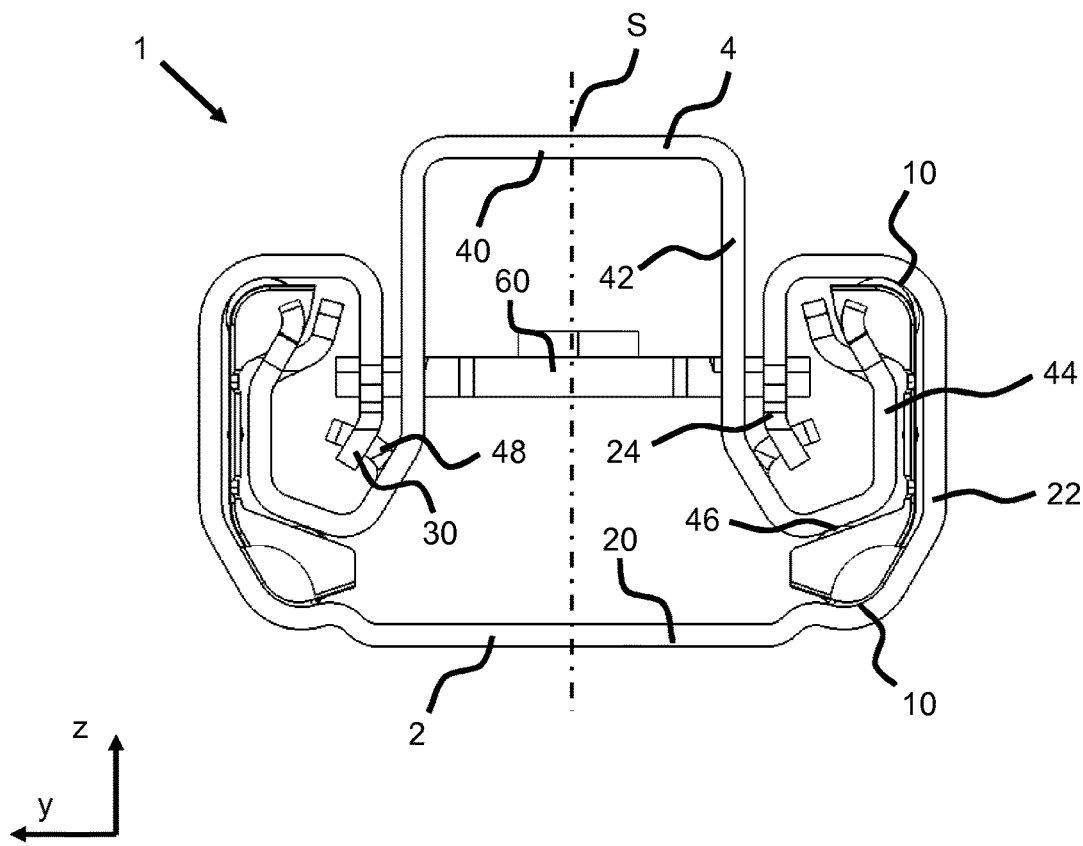
FIG. 3 is a schematic view from the front of the seat rail pair of the longitudinal adjuster according to the invention.

FIG. 3 shows a cross-section through the seat rail pair 1. The upper seat rail 4 has a substantially downwardly open U-shaped profile with end portions 44 which are bent upward at the outer side at the respective ends. The term "end portions" 44 is generally intended to refer to part-portions of the profile which are bent laterally outward and upward parallel with the transverse direction y and which are shaped by means of multiple bending operations. The U-shaped profile is formed by a vertically extending left member 42 and a right member 42, which is spaced apart parallel with the left member 42, and an upper base profile 40 which connects the two members 42 and which extends horizontally. At the two lower ends of the left and right member 42, there are provided end portions 44 which are bent upward and outward and which in known manner provide half of a bearing raceway 10 via which the upper seat rail 4 can be supported on the lower seat rail 2 by means of a bearing using balls.

The lower seat rail 2 substantially has a C-shaped profile with portions 24 which are bent downward at the respective ends, in particular bent back in an inward direction. The C-shaped profile of the lower seat rail 2 has a horizontally extending lower base 20 with mutually opposing profile portions 22 which extend parallel with each other substantially symmetrically with respect to an axis of symmetry S in an upward direction, wherein the profile portions 22 are angled inward in the region of the upper end thereof and extend so as to be orientated toward each other. At the free ends of the left and right profile portion 22, portions 24 which are bent downward are arranged. The lateral profile portions 22 represent in this instance the second half of the ball raceway 10 for guiding the balls.

The respective adjacent portions of the profiles of the lower seat rail 2 are constructed in each case so as to merge one into the other in a flowing manner. The respective adjacent portions of the profiles of the upper seat rail 4 are constructed in each case so as to merge one into the other in a flowing manner. Preferably, the profiles of the upper seat rail 4 and the lower seat rail 2 are each produced using a plurality of punching processes and shaping processes from a metal sheet.

The cross-sectional illustration of FIG. 3 further shows in detail that stop elements 48 which are formed in the upper seat rail 4 and end stops 30 which are formed in the lower seat rail 2 overlap each other when viewed in the longitudinal direction x. A correspondingly secure contacting of the stop elements 48 and the end stops 30 is thereby ensured. The end stops 30 are formed by means of angled and outwardly positioned free ends of the profile of the lower seat rail 2.

Figure 4:
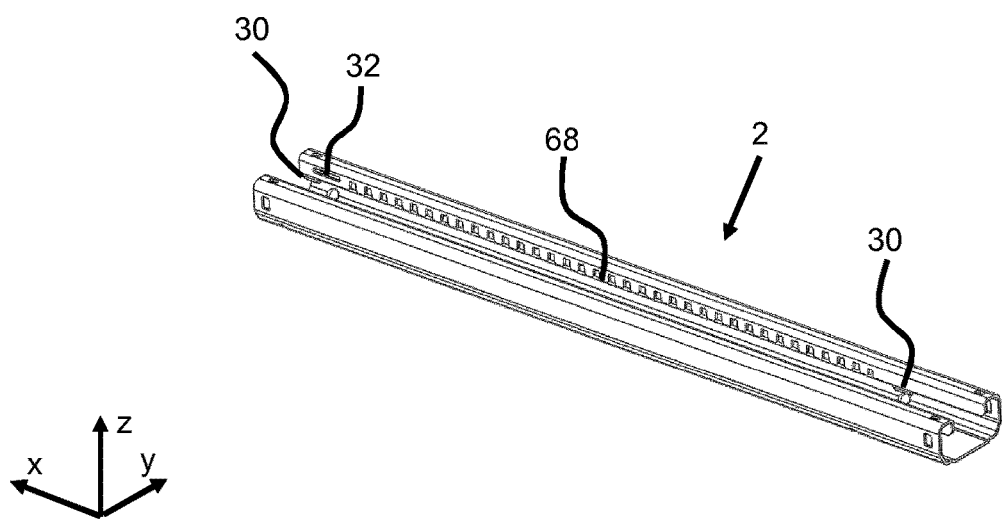
FIG. 4 is a perspective illustration of a lower seat rail of the seat rail pair of FIG. 3.

In FIG. 4, the lower seat rail 2 of the seat rail pair 1 is shown, wherein the tooth arrangement 68 extends substantially along the entire lower seat rail 2. The lower seat rail 2 has both at a front end and at a rear end the end stop 30 which when viewed in a longitudinal direction x is arranged in front of or behind the tooth arrangement 68, in particular adjacent. An arrangement of the end stops 30 is preferably symmetrical relative to a centrally arranged plane perpendicular to the transverse direction y. The end stop 30 which is, for example, arranged at the front end is when viewed in the longitudinal direction x preferably constructed in pairs symmetrically on the lower seat rail 2. The end stops 30 protrude further downward than the tooth arrangement 68, in particular the end stops 30, when viewed in the longitudinal direction x, are arranged substantially in alignment with the tooth arrangement 68. Furthermore, an elongate hole 32 is arranged in the region of the front end stop 30.

Figure 5A:
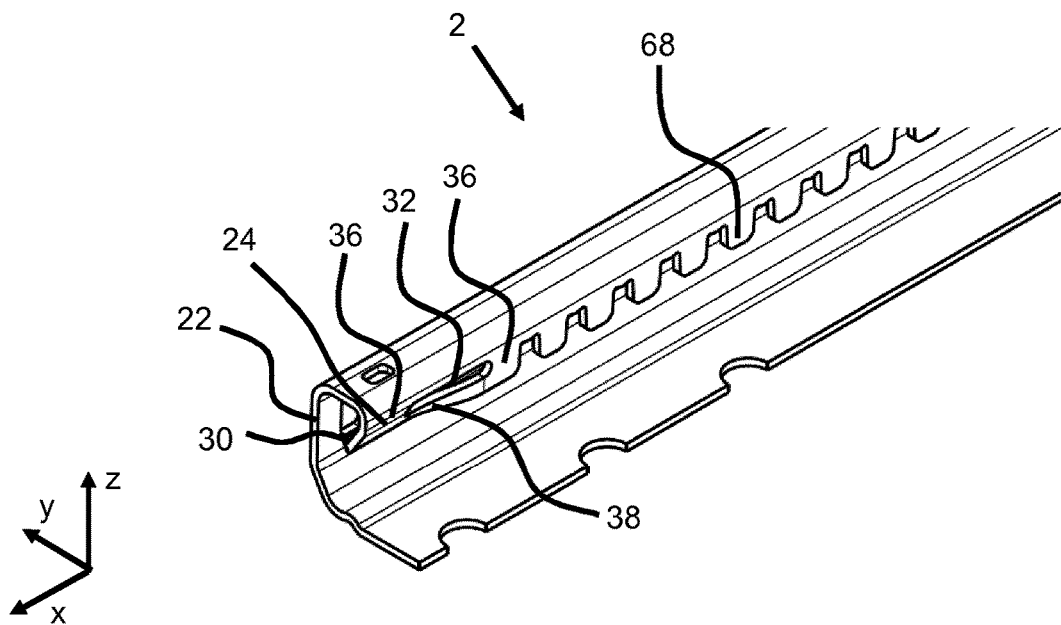
FIG. 5a is an enlarged partial view of an end portion of the lower seat rail of FIG. 4 with a bent-over end stop.
Figure 5B:
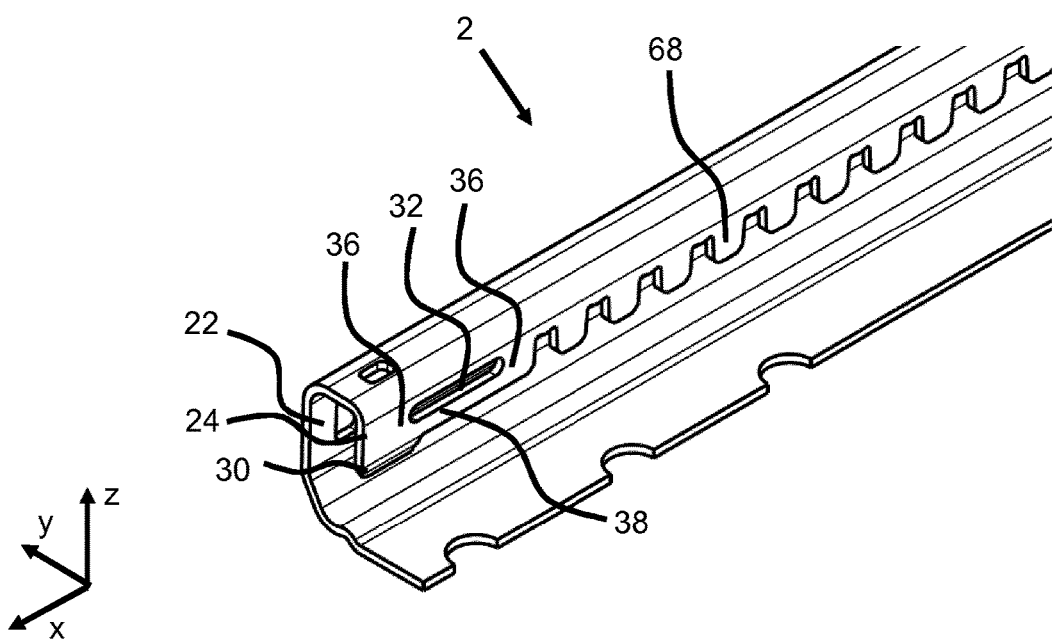
FIG. 5b is an enlarged partial view of an end portion of the lower seat rail of FIG. 4 with a straightened end stop.
Figure 6:
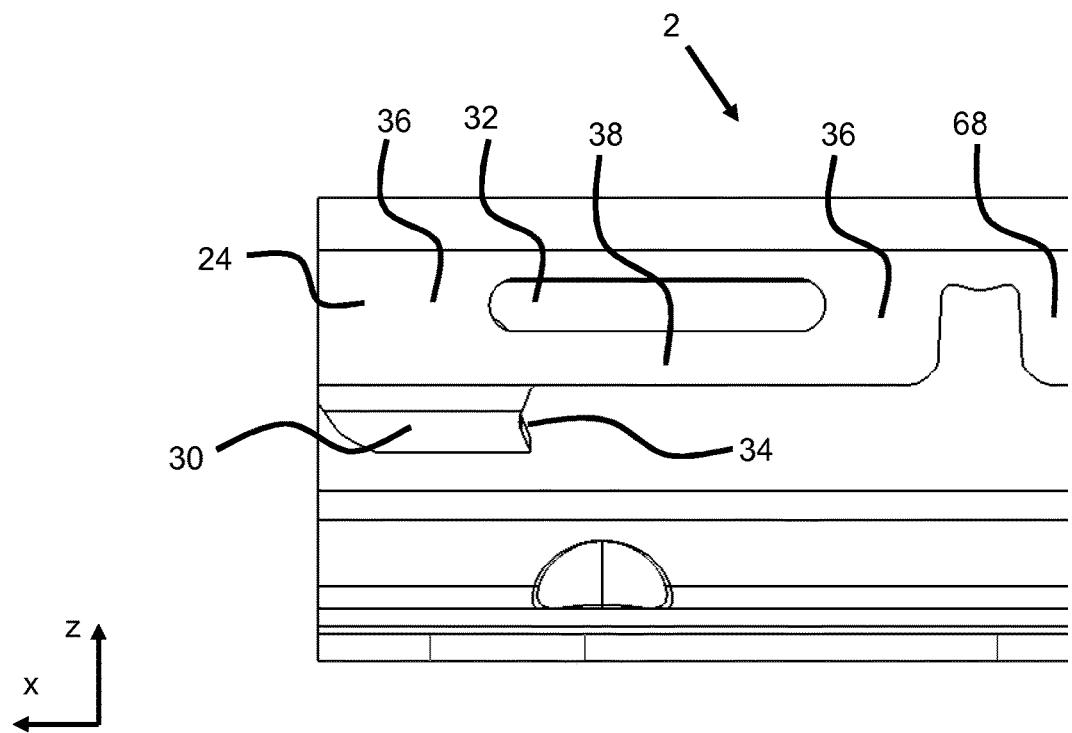
FIG. 6 is a view of a cut-out of a longitudinal section of the lower seat rail of FIG. 4.

As shown in FIGS. 5a, 5b and 6, the end stop 30 as a result of the elongate hole 32 is connected to the downwardly bent portion 24 of the lower seat rail 2 only by means of the two bridges 36 remaining at the side of the elongate hole 32. The elongate hole 32 brings about an increase in strength, in particular in order to prevent bending of the lower seat rail 2 about an axis in the transverse direction y. Preferably, the elongate hole 32 is arranged at the front end of the lower seat rail 2. Furthermore, as a result of the elongate hole 32, the advantage is afforded that the seat rail pair 1 can be more readily assembled. If, for example, the end stop 30, as shown in FIG. 5a, is bent outward prior to assembly and after assembly, as shown in FIG. 5b, back into the starting position, a bending line is limited only to a bridge 36 arranged above the end stop 30 and is correspondingly short. A web 38 formed below the elongate hole 32 is subjected during bending to only slight bending with a slight torsion. With heavier loads, in particular in the case of an impact, this web 38 absorbs tensile loads and prevents the front ends of the lower seat rail 2 and the upper seat rail 4 from bending upward.

The end stop 30 of the lower seat rail 2 has two stop faces 34 which are arranged at an obtuse angle with respect to each other. This arrangement of the stop face 34 forms a self-centering in the event of loading and ensures coverage of the end stop 30 and the stop elements 48, in particular the stop elements 48 can thereby be prevented from sliding off downward in a vertical direction z.

Figure 7:
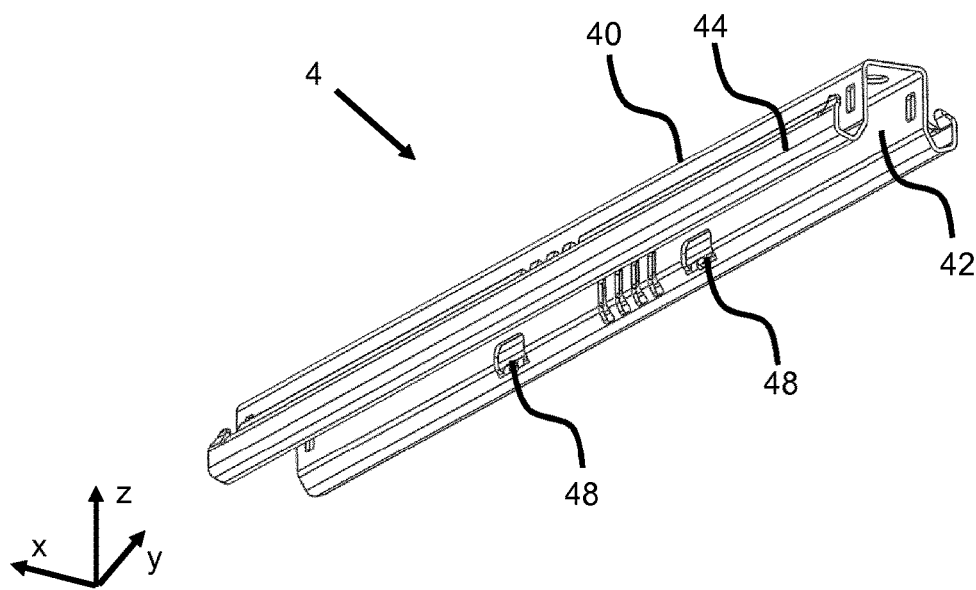
FIG. 7 is a perspective illustration of an upper seat rail of the seat rail pair of FIG. 3.

In FIG. 7, the upper seat rail 4 of the seat rail pair 1 is shown, wherein two stop elements 48 which are spaced apart from each other are arranged between the front end and the rear end, substantially in the region of a central third of the upper seat rail 4 when viewed in the longitudinal direction x. The stop elements 48 are when viewed in the longitudinal direction x also preferably constructed in pairs symmetrically on the upper seat rail 4. In an assembled state, the two stop elements 48 are arranged between the end stops 30 of the lower seat rail 2.

Figure 8:
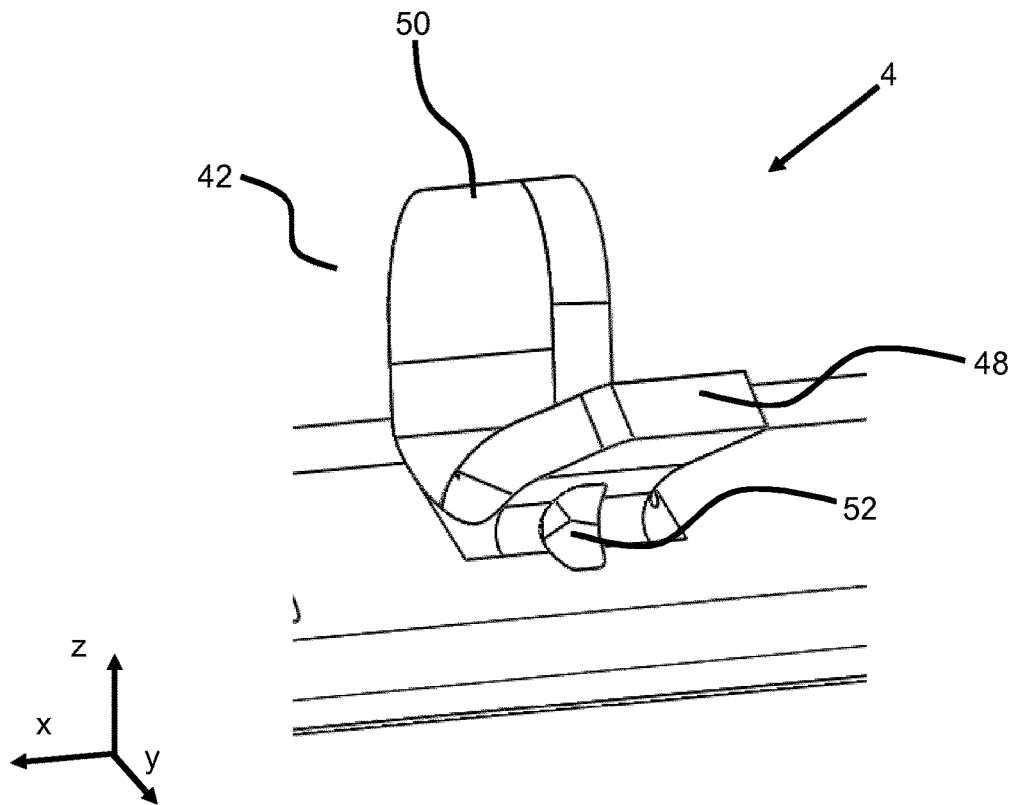
FIG. 8 is an enlarged illustration of a stop element of the upper seat rail of FIG. 7.

As shown in detail in FIG. 8, the stop element 48 is bent outward in a downward direction. Via the geometry of the opening 52 in the region of the bending location, the shaping of the bending can be influenced. An optimally positioned opening 52—in the simplest case a circular hole—brings about a selective weakening of the stop element 48 which can be changed over the length of the stop element 48. Consequently, the geometry can be adapted to the stop face 34 in the lower seat rail 2.

The opening 52 weakens the bent stop element 48 in a vertical direction z since in the event of high loads a bending about an axis in the longitudinal direction x is promoted. A weakening of the bending resistance about an axis in the vertical direction z is relatively speaking lower. Consequently, a sliding of the stop element 48 from the stop face 34 can be prevented or delayed. The stop face 34 of the lower seat rail 2 consequently remains in contact for longer with the stop elements 48, whereby the impact resistance is increased.

Figure 9:
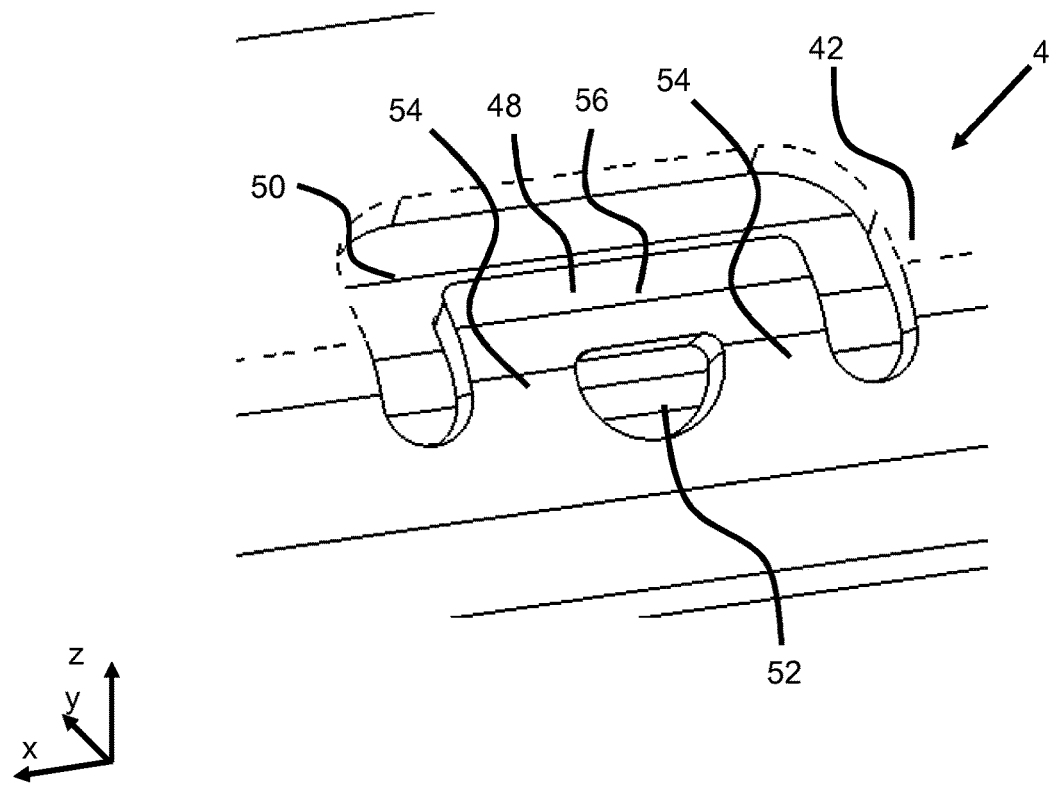
FIG. 9 is another illustration of the stop element of the upper seat rail of FIG. 7.

FIG. 9 shows a geometry of the stop element 48, which is influenced by the opening 52. The stop element 48 has a substantially elongate web 56 parallel with the longitudinal direction x, which is connected by means of two bridges 54 which are formed at the side of the opening 52 to the remaining upper seat rail 4. A free-cut 50 which extends around the stop element 48 at the outer side further delimits the stop element 48. The opening 52 preferably has the shape shown in FIG. 9. A desired bending shape in the plane in a transverse direction y and vertical direction z can thereby be defined.

Figure 10:
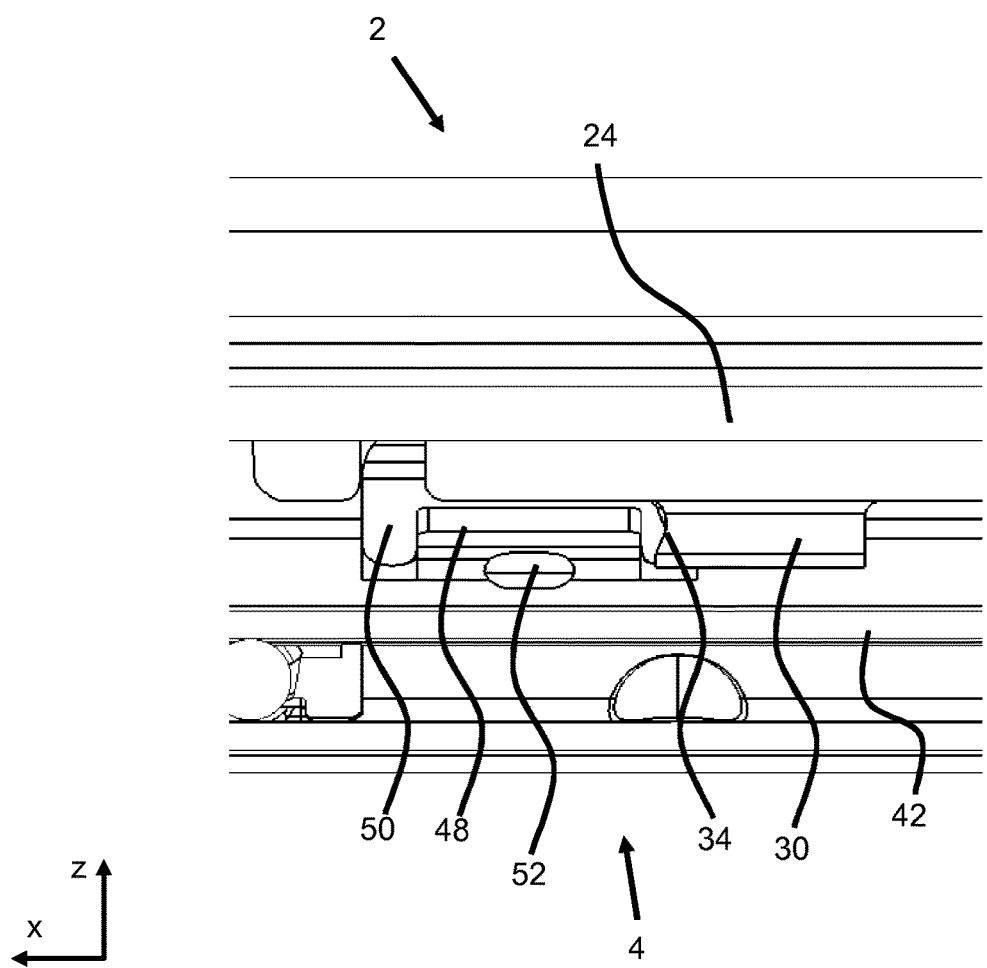
FIG. 10 is a view of a cut-out of a longitudinal section of the seat rail pair of FIG. 3.

As further shown in FIG. 10, the cooperation of the front stop element 48 when viewed in the longitudinal direction x with the end stop 30 located at the front end of the lower seat rail 2 results in a limitation of the displacement of the upper seat rail 4 relative to the lower seat rail 2 in a forward direction. In a correspondingly identical manner, the cooperation of the rear stop element 48 when viewed in the longitudinal direction x with the end stop 30 located at the rear end of the lower seat rail 2 results in a limitation of the displacement of the upper seat rail 4 relative to the lower seat rail 2 toward the rear.

The features disclosed in the above description, the claims and the drawings may be significant both individually and in combination for carrying out the invention in the various embodiments thereof.

Although the invention has been described in detail in the drawings and the above illustrations, the illustrations are intended to be understood to be illustrative and exemplary and non-limiting. In particular, the selection of the proportions of the individual elements illustrated in the drawings is not intended to be interpreted to be necessary or limiting. Furthermore, the invention is in particular not limited to the embodiments explained. Other variants of the invention and their construction will be appreciated by the person skilled in the art from the above disclosure, the Figures and the claims.

Terms used in the claims, such as "comprise", "have", "include", "contain" and the like do not exclude other elements or steps. The use of the indefinite article does not exclude a plural. An individual device can carry out the functions of a plurality of units or devices mentioned in the claims.

While specific embodiments of the invention have been shown and described in detail to illustrate the application of the principles of the invention, it will be understood that the invention may be embodied otherwise without departing from such principles.

The invention claimed is:

1. A longitudinal adjuster comprising:
at least one seat rail pair which is formed by a lower seat rail and an upper seat rail which is displaceably guided relative to the lower seat rail in a longitudinal direction,
wherein the two seat rails of the seat rail pair mutually engage around each other,
wherein the lower seat rail has a substantially C-shaped profile with end portions which are bent downward and the upper seat rail has a substantially U-shaped profile having end portions which are bent upward;
an end stop; and
a stop element,
wherein a relative displaceability of the two seat rails with respect to each other is limited by a cooperation of the end stop, which is arranged on the lower seat rail, with the stop element, which is integrally formed from the upper seat rail, wherein a free cut is only located on three sides of the stop element in the upper rail,
wherein the stop element is integrally formed from said upper seat rail first by two bridges extending transverse the longitudinal direction from said upper seat rail, wherein said bridges extend on either side of a stop element opening, and second by a web extending between the bridges and parallel the longitudinal direction, wherein said stop element opening extends from said web to a connection point between said bridges and said upper seat rail,
wherein the end stop is integrally formed from the downwardly bent portions and the lower seat rail has an elongate hole adjacent to the end stop;
wherein the end stop has two adjacent stop faces which are, viewed in a transverse direction, arranged at an obtuse angle relative to each other.

2. The longitudinal adjuster as claimed in claim 1, wherein the end stop, as a result of the elongate hole, is connected to the downwardly bent portion of the lower seat rail only by means of two bridges remaining at a side of the elongate hole.

3. The longitudinal adjuster as claimed in claim 1, wherein the end stop with respect to an extent in the longitudinal direction is arranged in a region of a front and/or rear end of the lower seat rail.

4. The longitudinal adjuster as claimed in claim 1, wherein the lower seat rail includes a tooth arrangement and the end stop protrudes further downward than the tooth arrangement.

5. The longitudinal adjuster as claimed in claim 4, wherein the end stop, with respect to an extent in the longitudinal direction, is arranged substantially in alignment with the tooth arrangement.

6. The longitudinal adjuster according to claim 1, wherein the end stop, with respect to an extent in the longitudinal direction, is arranged in front of and/or behind a tooth arrangement of the lower seat rail.

7. The longitudinal adjuster as claimed in claim 1, wherein the stop element is deployed in a transition region between the U-shaped profile of the upper seat rail and the respective end portions.

8. The longitudinal adjuster as claimed in claim 1, wherein the stop element is constructed substantially parallel with the transverse direction.

9. The longitudinal adjuster as claimed in claim 1, wherein two end stops are provided, one in a region of a front end of the lower seat rail and one in a region of a rear end of the lower seat rail.

10. The longitudinal adjuster as claimed in claim 9, wherein the stop element is arranged between the two end stops.

11. The longitudinal adjuster as claimed in claim 1, wherein the stop element is arranged in a central third of the upper seat rail in the longitudinal direction.

12. A vehicle seat having a longitudinal adjuster comprising:
at least one seat rail pair which a formed by a lower seat rail and an upper seat rail which is displaceably guided relative to the lower seat rail in a longitudinal direction,
wherein the two seat rails of the seat rail pair mutually engage around each other,
wherein the lower seat rail has a substantially C-shaped profile with end portions which are bent downward and the upper seat rail has a substantially U-shaped profile having end portions which are bent upward;
an end stop; and
a stop element,
wherein a relative displaceability of the two seat rails with respect to each other is limited by a cooperation with the end stop, which is arranged on the lower seat rail, with the stop element, which is formed from the upper seat rail,
wherein a free cut is only located on three sides of the stop element in the upper rail, wherein the end stop is integrally formed from the downwardly bent portions and the lower seat rail has an elongate hole adjacent to the end stop, wherein the end stop has two adjacent stop faces which are arranged at an obtuse angle relative to each other;

wherein the stop element is integrally formed from said upper seat rail first by two bridges extending transverse the longitudinal direction from said upper seat rail, wherein said bridges extend on either side of a stop element opening, and second by a web extending between said bridges and parallel the longitudinal direction, wherein said stop element opening extends from said web to a connection point between said bridges and said upper seat rail.

13. The vehicle seat as claimed in claim 12, wherein two bridges, at a side of the elongate hole, connect the end stop to the downwardly bent portion of the lower seat rail.

14. The vehicle seat as claimed in claim 12, wherein the end stop, with respect to an extent in the longitudinal direction, is arranged in a region of a front end and/or a rear end of the lower seat rail.

15. The vehicle seat as claimed in claim 12, wherein the lower seat rail includes a tooth arrangement and the end stop protrudes downward an extent that is greater than a downward extent of the tooth arrangement.

16. The vehicle seat as claimed in claim 15, wherein the end stop, with respect to an extent in the longitudinal direction, is arranged substantially in alignment with the tooth arrangement.

\* \* \* \* \*